United States Patent
Wang

(10) Patent No.: US 8,292,956 B2
(45) Date of Patent: Oct. 23, 2012

(54) SILICONE ELASTOMER COMPOSITION FOR ARTIFICIAL INTEGUMENT

(75) Inventor: Wei Hong Wang, Chiba (JP)

(73) Assignee: Dow Corning Toray Company, Ltd., Chiyoda-ku, Tokyo (JP)

( * ) Notice: Subject to any disclaimer, the term of this patent is extended or adjusted under 35 U.S.C. 154(b) by 353 days.

(21) Appl. No.: 12/516,824

(22) PCT Filed: Dec. 5, 2007

(86) PCT No.: PCT/JP2007/073471
§ 371 (c)(1),
(2), (4) Date: May 29, 2009

(87) PCT Pub. No.: WO2008/072517
PCT Pub. Date: Jun. 19, 2008

(65) Prior Publication Data
US 2010/0056715 A1    Mar. 4, 2010

(30) Foreign Application Priority Data

Dec. 15, 2006 (JP) .................... 2006-338366

(51) Int. Cl.
*A61L 27/60* (2006.01)
(52) U.S. Cl. .................. 623/15.12; 623/15.11; 524/588
(58) Field of Classification Search ............. 524/588
See application file for complete search history.

(56) References Cited

U.S. PATENT DOCUMENTS

| | | | |
|---|---|---|---|
| 6,075,112 A | 6/2000 | Masakazu et al. | |
| 6,547,563 B1 * | 4/2003 | Hosoi et al. | 433/168.1 |
| 2002/0143082 A1 * | 10/2002 | Canpont et al. | 523/212 |

FOREIGN PATENT DOCUMENTS

| | | |
|---|---|---|
| EP | 0727462 | 8/1996 |
| JP | 55106139 | 8/1980 |
| JP | 57144739 A | 9/1982 |
| JP | 60171430 A | 9/1985 |
| JP | 01094828 A | 4/1989 |
| JP | 03139565 A | 6/1991 |
| JP | 07207036 A | 8/1995 |
| JP | 08041363 A | 2/1996 |
| JP | 10212413 A | 8/1998 |
| JP | 2006141564 A | 6/2006 |
| JP | 2006205345 A | 8/2006 |

OTHER PUBLICATIONS

"Introduction to Dynamic Mechanical Analysis (DMA)—A Beginner's Guide" (2008), PerkinElmer Inc.*
English language abstract for JP 57144739 extracted from PAJ database, dated May 12, 2009, 4 pages.
English language abstract for JP 60171430 extracted from PAJ database, dated May 12, 2009, 4 pages.
English language abstract for JP 01094828 extracted from PAJ database, dated May 12, 2009, 5 pages.
English language abstract for JP 03139565 extracted from PAJ database, dated May 12, 2009, 7 pages.
English language translation and abstract for JP 07207036 extracted from PAJ database, dated Sep. 3, 2009, 21 pages.
English language translation and abstract for JP08041363 extracted from PAJ database, dated Sep. 3, 2009, 52 pages.
English language translation and abstract for JP 10212413 extracted from PAJ database, dated Sep. 3, 2009, 42 pages.
English language translation and abstract for JP 2006141564 extracted from PAJ database, dated Sep. 3, 2009, 33 pages.
English language translation and abstract for JP 2006205345 extracted from PAJ database, dated Sep. 3, 2009, 61 pages.
PCT International Search Report for PCT/JP2007/073471 dated Feb. 12, 2008, 2 pages.
Extended European Search Report of European Application No. 07850113.7 dated Feb. 9, 2011; 5 pages.
International Search Report and the Written Opinion of the International Searching Authority; PCT/JP2007/073471; dated Feb. 9, 2011; 5 pages.
Dynamic Analysis of Silicone Elastomers, Antal Huba et al., Material Science Forum, 85, 473-474, 2005.
SDC, Phase 3, Chapter 2, Silicones in Industrial Applications, No. 11, Silicones in the Electronics Industries, Inorganic Polymers, Nova Science Publishers, 2007.

* cited by examiner

Primary Examiner — Marc Zimmer
(74) Attorney, Agent, or Firm — Howard & Howard Attorneys PLLC

(57) ABSTRACT

The present invention relates to a silicone elastomer composition for an artificial integument which satisfies the following formula:

$$\tan \delta \geq 0.23 - 0.006X$$

wherein tan δ represents the loss tangent of a cured product of the aforementioned composition; and X represents the Asker C hardness of a cured product of the aforementioned composition. With the composition of the present invention, an artificial integument which has not only a similar outer appearance, but also a similar flexible feeling on touch to the skin, can be obtained by a simple process.

13 Claims, No Drawings

SILICONE ELASTOMER COMPOSITION FOR ARTIFICIAL INTEGUMENT

RELATED APPLICATIONS

This application claims priority to and all the advantages of International Patent Application No. PCT/JP2007/073471, filed on Dec. 5, 2007, which claims priority to Japanese Patent Application No. JP2006-338366, filed on Dec. 15, 2006.

TECHNOLOGICAL FIELD

The present invention relates to a curable silicone elastomer composition for use in an artificial integument. Here, the term "integument" means a substance coating a living organism, and includes, for example, skin, mucosal membrane, scalp, nail and the like.

BACKGROUND ART

Conventionally, a model or robot equipped with an artificial integument, and in particular, a humanoid model or robot is known. Japanese Unexamined Patent Application, First Publication No. S57-144739 discloses a mannequin using an artificial integument made of a silicone rubber which is stain-resistant and in which stains are easily removed even if stains adhere thereto.
[Patent Document 1] Japanese Unexamined Patent Application, First Publication No. S57-144739

DISCLOSURE OF THE INVENTION

Problems to be Solved by the Invention

A humanoid model or robot such as a mannequin, in which, in general, at least one part thereof is coated with an integument, is used under the condition in which visitors, users and the like see in many cases or may touch in some cases. For this reason, it is desirable to make the integument used therefor similar to a real one in view of outer appearance and feeling on touch.

However, the artificial integument made of a silicone rubber described in Japanese Unexamined Patent Application, First Publication No. S57-144739 exhibits superior resistance with respect to stains on the surface thereof, but fails to exhibit flexibility, and in particular, leaves much to be improved in view of feeling on touch.

The present invention has been completed under the aforementioned circumstances in the prior art. An objective of the present invention is to provide an artificial integument having flexibility and possessing a feeling on touch which is very close to a real integument and the like, by a simple process, and provide a composition usable in the aforementioned process.

Means for Solving the Problems

The objective of the present invention can be achieved by a silicone elastomer composition for an artificial integument satisfying a requirement expressed by the following formula:

$$\tan \delta \geq 0.23 - 0.006 X$$

wherein tan δ represents the loss tangent of a cured product of the composition; and X represents the Asker C hardness of a cured product of the composition. The aforementioned tan δ is preferably 0.2 or more, and/or X is preferably a positive number of 20 or less.

The composition of the present invention preferably contains fine powder of a silica in an amount ranging from 5 to 30% by mass, and the fine powder of the silica preferably contains a wet silica in an amount of 10% by mass or more with respect to the amount of the fine powder of the silica.

In addition, the viscosity of the composition of the present invention is preferably not more than 20,000 mPa·s.

In addition, the composition of the present invention is preferably a silicone elastomer composition which is curable by an addition reaction at room temperature. The aforementioned composition preferably contains an alkenyl group-containing siloxane.

The artificial integument of the present invention is formed from a cured product obtained by curing the aforementioned silicone elastomer composition for an artificial integument, and the tensile strength thereof is preferably not less than 0.3 MPa, and/or the elongation thereof is preferably 420% or more.

The artificial integument of the present invention is preferably used as the integument of a model or robot.

Effect of the Invention

Heretofore, a relationship between a feeling on touch of a silicone elastomer and the loss tangent thereof has never been discussed. In addition, as a result of diligent studies for imparting a skin-like feeling on touch to a silicone elastomer, it was discovered that the feeling on touch of a silicone elastomer possesses a close relationship with the loss tangent thereof, and the present invention was completed by a technological idea in which by specifying the loss tangent thereof within a specified range on the basis of the Asker C hardness of the silicone elastomer, a skin-like feeling on touch can be provided in the aforementioned silicone elastomer.

Therefore, by means of the silicone elastomer composition for an artificial integument of the present invention, an artificial skin which is flexible and possesses a feeling on touch which is very similar to that of real skin can be produced. The artificial integument of the present invention can be suitably used as the integument of a model or robot, and in particular, a humanoid model or robot. In addition, the artificial integument of the present invention can form various models such as medical organs, organ models, animal models and the like, by itself or in combination with other materials.

In particular, when the silicone elastomer composition of the present invention contains an alkenyl group-containing siloxane as a curing retardant, discoloration of the cured product can be inhibited. For this reason, it can be easy to adjust the color of the integument by adding coloring materials such as pigments, dyes and the like.

BEST MODES FOR CARRYING OUT THE INVENTION

The silicone elastomer composition for an artificial integument of the present invention is formed from a curable silicone composition having a property of forming an elastomer at room temperature or under a heating condition. The term "room temperature" used herein means a temperature ranging from 15° C. to 45° C., preferably ranging from 20° C. to 40° C., and more preferably of 25° C.

In the silicone elastomer composition for artificial integument of the present invention, a cured product thereof satisfies the following formula:

$$\tan \delta \geq 0.23 - 0.006X$$

wherein tan δ represents the loss tangent of the aforementioned cured product of the composition; and X represents the Asker C hardness of a cured product of the aforementioned composition.

The loss tangent (tan δ) is the ratio of a storage elastic modulus (G') corresponding to elasticity and a loss elastic modulus (G") corresponding to viscosity, that is, G"/G', and reflects oscillation absorbability. The loss tangent in the aforementioned formula can be obtained by measuring the viscoelasticity of a cured product of the silicone elastomer composition. If the loss tangent is remarkably reduced, the feeling on touch of the skin is impaired, and a hardness is given such that a core is present when the cured product is touched. If the loss tangent is 0.2 or more, a very skin-like feeling on touch of the cured product can be obtained. Therefore, this is preferable. The loss tangent is more preferably 0.25 or more and is, in particular, preferably 0.3 or more.

The Asker C hardness is a hardness which is specified in JIS K7312, and is mainly applied to a soft elastomer. In the present invention, the Asker C hardness indicates a value measured by means of a type C hardness tester specified in JIS K7312. For example, an Asker C hardness of 20 means that the value measured by the aforementioned tester is 20. An Asker C hardness means that as the value is increased, "hardness" is increased. When the Asker C hardness exceeds 20, flexibility of the integument is impaired. For this reason, X in the aforementioned formula is preferably a positive number of 20 or less, i.e., $0 < X \leq 20$, and more preferably $0 < X \leq 10$.

Commonly, as the Asker C hardness is increased, the loss tangent (tan δ) tends to be reduced. However, in a cured product of the silicone elastomer composition for an artificial integument of the present invention which satisfies the relationship of tan $\delta \geq 0.23 - 0.006X$ (X: Asker C hardness), a skin-like feeling on touch can be obtained.

The cured product of the silicone elastomer composition for an artificial integument of the present invention has a tensile strength of preferably at least 0.3 MPa, and more preferably at least 0.4 MPa and/or has an elongation of preferably at least 420% and more preferably at least 500%, in order to prevent damage at the time of removing a cured product from a mold and enhance operationability at the time of molding.

The physical properties, curing types and compositions of the silicone elastomer compositions for an artificial integument of the present invention are not particularly limited as long as the cured products therefrom satisfy the relationship of tan $\delta \geq 0.23 - 0.006X$. Since superior fluidity in a mold is exhibited and operationability at the time of molding is improved, the viscosity thereof is preferably not more than 20,000 mPa·s and more preferably not more than 10,000 mPa·s.

The silicone elastomer composition for an artificial integument of the present invention is preferably a silicone elastomer composition which is curable by an addition reaction at room temperature. As examples of the aforementioned compositions, mention may be made of, for example, the compositions containing the following components (A) to (D). Each of the aforementioned components (A) to (D) may be used as a single product or in combination with two or more types thereof.

(A) an organopolysiloxane having at least two alkenyl groups bonded to silicon atoms in a molecule, (B) an organohydrogenpolysiloxane having at least three hydrogen atoms bonded to silicon atoms in a molecule, (C) a catalyst for a hydrosilylation reaction, and (D) fine powder of a silica.

The aforementioned component (A) is an organopolysiloxane having at least two alkenyl groups bonded to silicon atoms in a molecule. As examples of the aforementioned alkenyl groups, mention may be made of, for example, a vinyl group, an allyl group, a propenyl group, an isopropenyl group, a butenyl group, an isobutenyl group, a pentenyl group, a hexenyl group, a heptenyl group, and the like. A vinyl group is preferable. The bonding position of the aforementioned alkenyl group to the silicon atom is not particularly limited, and can be the end of the molecular chain and/or the side chain of the molecular chain. In addition, the aforementioned component (A) may have an organic group other than the alkenyl group bonded to the silicon atom. The aforementioned organic group is, for example, a non-substituted or substituted monovalent hydrocarbon group usually having 1 to 10 carbon atoms and preferably having 1 to 8 carbon atoms, such as an alkyl group such as a methyl group, an ethyl group, a propyl group, a butyl group, a pentyl group, a hexyl group, or the like; a cycloalkyl group such as a cyclopentyl group, a cyclohexyl group or the like; an aryl group such as a phenyl group, a tolyl group, a xylyl group, a naphthyl group or the like; an aralkyl group such as a benzyl group, a phenylethyl group or the like; a halogen-substituted alkyl group such as a 3,3,3-trifluoropropyl group, a 3-chloropropyl group or the like; or the like. A methyl group is preferable.

The viscosity of the aforementioned component (A) at 25° C. preferably ranges from 0.05 to 100 Pa·s and more preferably ranges from 0.1 to 40 Pa·s. The siloxane skeleton of the organopolysiloxane of the aforementioned component (A) may be linear or branched or a combination thereof. A substantially linear diorganopolysiloxane in which the main chain is formed from repeated diorganosiloxane units, and both ends of the molecular chain are blocked with triorganosiloxy groups is preferable. In particular, when the loss tangent of a cured product of the composition of the present invention is specified in an appropriate range by reducing the crosslinking density of the composition, a linear organopolysiloxane having alkenyl groups (preferably a vinyl groups) bonded to the silicon atoms at both ends of the molecular chain with high viscosity (high molecular weight) is preferable.

The aforementioned component (B) is an organohydrogenpolysiloxane having at least three hydrogen atoms bonded to silicon atoms in a molecule. The hydrogen atoms bonded to the silicon atoms can be positioned in the terminal siloxane unit and/or the siloxane unit in a polymer chain. The organohydrogenpolysiloxane is a linear siloxane polymer, and essentially contains an RHSiO unit and an $R_2XSiO_{1/2}$ unit, wherein R can be a non-substituted or substituted monovalent hydrocarbon group having 1 to 10 carbon atoms and preferably having 1 to 8 carbon atoms and having no alkenyl group, which is the same as the organic group in the aforementioned component (A), and is preferably a methyl group; and X represents a hydrogen atom or R, in a molecule, and optionally contains a unit of an $R_2SiO$ group.

The total amount of the hydrogen atoms bonded to the silicon atom (i.e., SiH group) present in the aforementioned component (B) preferably ranges from 0.4 to 3 per alkenyl group in the aforementioned component (A), and preferably ranges from 0.4 to 1.5. Therefore, the relative amount of the aforementioned component (B) with respect to 100 parts by mass of the aforementioned component (A) is preferably appropriately specified within a range of from 1 to 1,000 parts by mass in order to maintain the aforementioned relationship. When the loss tangent of a cured product of the composition of the present invention is specified in an appropriate range by reducing the crosslinking density of the composition, the blending amount of the aforementioned component (B) is preferably reduced (for example, 1 to 20% by mass with respect to the amount of the composition, and more preferably 1 to 15% by mass).

The viscosity of the organohydrogenpolysiloxane of the aforementioned component (B) at 25° C. preferably ranges from 0.001 to 10 Pa·s and more preferably ranges from 0.01 to 5 Pa·s. As examples of the aforementioned component (B), for example, those represented by the following formulae may be mentioned.

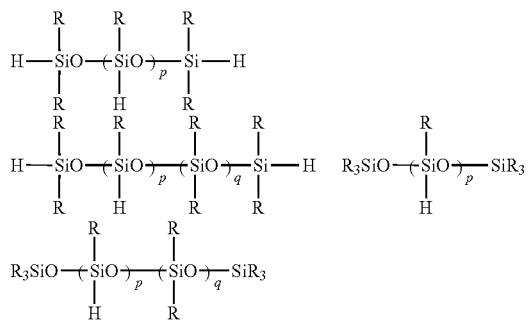

wherein R has the same meaning as described above; and each of p and q is independently an integer of 1 or more, and p and p+q are values satisfying the aforementioned viscosity.

The aforementioned component (C) is a catalyst for an addition reaction (hydrosilylation) between the alkenyl group in the aforementioned component (A) and the SiH group in the aforementioned component (B). Any catalyst may be used therefor as long as the catalyst promotes the aforementioned addition reaction.

As the hydrosilylation catalyst, for example, at least one catalyst selected from platinum-based catalysts, palladium-based catalysts, and rhodium-based catalysts is used. In particular, for example, chloroplatinic acid, an alcohol-modified chloroplatinic acid, a coordination compound between chloroplatinic acid and an olefin, vinylsiloxane or an acetylene compound, tetrakis(triphenylphosphine) palladium, chlorotris(triphenylphosphine) rhodium or the like is used. In particular, a platinum-based compound is preferable. The aforementioned component (C) may be used in an amount effective as a catalyst (so-called catalytic amount). In particular, for example, the catalyst is added in an amount (as a metal element content) on the basis of mass with respect to the total amount of the aforementioned component (A) and component (B), which is in the range of about from 0.01 to 500 ppm and preferably ranging from 0.1 to 100 ppm.

The aforementioned component (D) is fine powder of a silica, which acts as a reinforcement of a cured product of the composition of the present invention. In other words, the composition of the present invention is preferably used as a molding material to be shaped in a mold. In this case, in order to prevent damage at the time of removing from a mold, increased tensile strength and elongation are, in particular, required. Therefore, in the composition of the present invention, by using fine powder of a silica as a reinforcement, a cured product satisfying the aforementioned strength properties can be formed. The fine powder of a silica as the aforementioned component (D) has a specific surface area measured by a BET method which is preferably not less than 50 m²/g, and more preferably ranges from 100 to 300 m²/g. If the specific surface area is less than 50 m²/g, satisfactory strength properties may not be imparted.

As the fine powder of a silica, for example, a dry silica such as a fumed silica or the like, or a synthetic silica such as a wet silica or the like can be used. The aforementioned silicas have a large amount of silanol groups on the surface thereof. For this reason, they can also be used as a so-called hydrophobic silica of which the surface is treated with, for example, a silylation agent such as a halogenated silane, an alkoxysilane, various silazane compounds (such as hexamethyldisilazane, and tetramethyldivinyldisilazane). Instead of using the hydrophobic silica, a master batch obtained by mixing the organopolysiloxane of the aforementioned component (A), fine powder of silica and the aforementioned silylation agent can also be used. The blending amount of the fine powder of the silica preferably ranges from 5 to 30% by mass with respect to the amount of the composition, and more preferably ranges from 10 to 30% by mass, and in particular, ranges from 15 to 20% by mass. If the blending amount exceeds 30% by mass with respect to the amount of the composition, molding operationability of the composition may be impaired.

In order to specify the loss tangent in an appropriate range, and at the same time, maintain other physical properties of a cured product of the composition of the present invention, a wet silica is preferably used. More particularly, the ratio of the wet silica used is preferably not less than 10% by mass with respect to the amount of the fine powder of silica, more preferably 40% by mass or more, and in particular, preferably 100% by mass. For example, if a wet silica is contained as fine powder of the silica, the loss tangent (tan δ), elongation, and tensile strength tend to be increased in the case of having the same Asker C hardness of a cured product of the aforementioned composition. On the other hand, in the case of emphasizing transparency or coloring properties of a cured product of the aforementioned composition, a dry silica is preferably used. In this case, the blending amount of the dry silica is preferably not less than 10% by mass with respect to the amount of the fine powder of silica, and more preferably not less than 40% by mass, and in particular, preferably 100% by mass.

In the composition of the present invention, in addition to the aforementioned components, (E) a linear organopolysiloxane having hydrogen atoms bonding to silicon atoms at both ends of the molecular chain and having no aliphatic unsaturation bond in the molecule is preferably added. The viscosity of the aforementioned component (E) at 25° C. ranges from 0.001 to 10 Pa·s, and preferably ranges from 0.01 to 1 Pa·s. The aforementioned linear organopolysiloxane acts to increase the molecular chain length of the aforementioned component (A) when the composition of the present invention is cured, and the loss tangent (tan δ), elongation and tensile strength of a cured product of the composition of the present invention can be increased.

As the organopolysiloxane of the aforementioned component (E), for example, an organohydrogenpolysiloxane having hydrogen atoms bonded to the silicon atoms at both ends of the molecular chain, represented by the following general formula (I) is preferable.

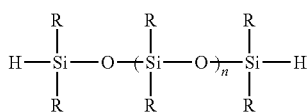

(I)

wherein R is a non-substituted or substituted monovalent hydrocarbon group which does not contain an alkenyl group; and n is a value such that the viscosity of the aforementioned organopolysiloxane at 25° C. is within the aforementioned range.

In the aforementioned general formula (I), R is a non-substituted or substituted monovalent hydrocarbon group which does not contain an alkenyl group. As examples thereof, mention may be made of, for example, monovalent hydrocarbon groups usually having 1 to 10 carbon atoms and preferably having 1 to 8 carbon atoms, such as an alkyl group such as a methyl group, an ethyl group, a propyl group, a butyl group, a pentyl group, a hexyl group, or the like; a cycloalkyl group such as a cyclopentyl group, a cyclohexyl group or the like; an aryl group such as a phenyl group, a tolyl group, a xylyl group, a naphthyl group or the like; an aralkyl group such as a benzyl group, a phenylethyl group or the like; a halogen-substituted alkyl group such as a 3,3,3-trifluoropropyl group, a 3-chloropropyl group or the like; or the like. The particularly preferable R is a methyl group. "n" is a value such that the viscosity of the organopolysiloxane at 25° C. ranges from 0.001 to 10 Pa·s and preferably ranges from 0.01 to 1 Pa·s, as described above.

In the case of using the aforementioned component (E), the total amount of the hydrogen atom bonding to the silicon atom (i.e., SiH group) present in the aforementioned component (E) and component (B) preferably ranges from 0.4 to 3 per alkenyl group in the aforementioned component (A), and preferably ranges from 0.4 to 1.5. Therefore, the relative amount of the aforementioned component (B) and component (E) with respect to 100 parts by mass of the aforementioned component (A) is preferably appropriately determined within a range of from 1 to 1,000 parts by mass in order to maintain the aforementioned relationship. In addition, the number of hydrogen atoms bonded to the silicon atoms in the aforementioned component (E) preferably ranges from 20 to 85% by mol with respect to the total amount of the hydrogen atoms bonded to the silicon atoms in the aforementioned component (E) and component (B), and more preferably ranges from 30 to 70% by mol. When the loss tangent of a cured product of the composition of the present invention is specified in an appropriate range by reducing the crosslinking density of the composition, the blending amount of the total of the aforementioned component (B) and component (E) is preferably reduced (for example, 1 to 10% by mass of the composition, and more preferably 1 to 5% by mass).

In particular, in the case of using a dry silica as the aforementioned component (D), adding the aforementioned component (E) together with the aforementioned component (B) to the composition of the present invention is preferable since the loss tangent (tan δ) of a cured product of the aforementioned composition can be appropriately controlled.

In addition, in the composition of the present invention, (F) a non-functional organopolysiloxane having a viscosity at 25° C. ranging from 0.01 to 500 Pa·s, and preferably ranging from 0.03 to 100 Pa·s may be blended. The aforementioned component (F) is used, if necessary, which acts as a mold release agent in the composition of the present invention. The preferable component (F) is a linear non-functional organopolysiloxane. If the organopolysiloxane has an addition-reactive functional group such as an alkenyl group, a hydrosilyl group (SiH group) or the like, the aforementioned component (F) is fixed in the cured product of the composition of the present invention, and effects of releasing from the mold cannot be exhibited. Therefore, as examples of substituents bonded to the silicon atom of the non-functional organopolysiloxane, mention may be made of an alkyl group such as a methyl group, an ethyl group, a propyl group, or the like; an aryl group such as a phenyl group, a tolyl group, or the like; a halogen-substituted alkyl group such as a 3,3,3-trifluoropropyl group, a 3-chloropropyl group or the like; or the like. A methyl group is preferable. The blending amount of the aforementioned component (F) ranges from 0 to 20 parts by mass with respect to 100 parts by mass of the aforementioned component (A), and preferably ranges from 5 to 10 parts by mass. If the blending amount of the aforementioned component (F) exceeds 20 parts by mass with respect to 100 parts by mass of the aforementioned component (A), substances in the form of an oil derived from component (F) may bleed from the cured product in some cases.

In addition, in the composition of the present invention, it is possible to add a curing retardant. For example, a trace amount or a small amount of an acetylene-based compound such as 3-methyl-1-butyn-3-ol, 3,5-dimethyl-1-hexyl-3-ol, phenylbutynol or the like; an alkenyl group-containing siloxane such as 1,3,5,7-tetramethyl-1,3,5,7-tetravinylcyclotetrasiloxane, 1,3-divinyl-tetramethyldisiloxane or the like; a triazole compound such as benzotriazole or the like; an alkynylsilane such as methyl(tris(1,1-dimethyl-2-propinyloxy)silane or the like; a phosphine compound; a mercapto compound or the like can be added thereto. As the curing retardant, an alkenyl group-containing siloxane is preferable, and an alkenyl group-containing siloxane with a low molecular weight in which the amount of the alkenyl group is not less than 20% by mass is more preferable, because even if the composition of the present invention contains ammonia which causes discoloration, discoloration of a cured product of the aforementioned composition can be controlled. A vinyl group-containing siloxane is, in particular, preferable. The color of the cured product does not affect the physical properties thereof. For this reason, in the usage in which the degree of discoloration of the cured product such as a black integument or the like is no matter, the alkenyl group-containing siloxane as a curing retardant is optionally added.

In the composition of the present invention, in addition to the aforementioned components, common additives can be added. As examples thereof, mention may be made of, for example, an organopolysiloxane resin containing an $SiO_2$ unit or an $R_1SiO_{3/2}$ unit and having at least two alkenyl groups per molecule. In addition thereto, inorganic pigments such as iron oxide, red iron oxide, cobalt blue and the like, organic dyes such as azo-based dyes, quinoline-based dyes and the like, cerium oxide, zinc carbonate, manganese carbonate, titanium oxide, carbon black and the like may be added.

The silicone elastomer composition of the present invention forms an elastomer as a cured product by curing, for example, under a temperature condition ranging from, for example, 20° C. to 150° C. and preferably of not more than 50° C., and more preferably at room temperature.

A cured product of the silicone elastomer composition of the present invention possesses a skin-like feeling on touch, in addition to increased flexibility and deformability which are intrinsic to silicone elastomers. For this reason, the cured product is suitable for an artificial integument, and in particular, is useful as an integument of a model or robot, and in particular, a humanoid model or robot having movable parts.

The artificial integument of the present invention can be obtained by preparing, for example, a mold form composed of an outer mold form having an interior surface of an outer appearance shape of a human being and an inner mold form arranged so as to hold a cavity with the aforementioned outer mold form; introducing a silicone elastomer of the present invention in the aforementioned cavity; curing the silicone elastomer; and subsequently, removing the outer mold form from the mold form. As described above, by curing the silicone elastomer composition of the present invention in the cavity in the hermetically closed mold, an artificial integument can be effectively produced. The artificial integument of the present invention can be subjected to coloration, hair implantation or the like, if necessary.

The artificial integument of the present invention can be integrated with the surface of a substrate formed from a flexible material such as a polyurethane foam, a soft polyvinyl chloride, a silicone elastomer or the like, via an adhesive or a primer, if necessary. Thereby, elasticity and skin-like feeling on touch which are close to those of the human body can be realized. Thereby, an exquisite model or robot which is extremely close to a real human being can be produced.

In addition, the artificial integument of the present invention can be suitably used as component parts of various models such as medical organs, organ models or animal models for use in medical or nursing practice, in addition to the humanoid models or robots. For example, in the case of a small organ model such as a crystalline lens in an ocular globe, the artificial integument of the present invention can be used as it is. On the other hand, in the case of a relatively large organ model such as lungs, the artificial integument of the present invention can be used in combination with a substrate.

EXAMPLES

Hereinafter, the present invention is described in detail with reference to Examples. It should be understood that the present invention is not limited to the Examples. In the Examples, viscosity at 25° C. is shown.

Preparation Example 1

100 parts by mass of a dimethylpolysiloxane with both ends of the molecular chain blocked with dimethylvinylsiloxy groups, having a viscosity of 400 mPa·s (content of vinyl groups=about 0.47% by mass), 53 parts by mass of a dry silica (CAB-O-SIL S-17D), 10.6 parts by mass of hexamethyldisilazane, 4.2 parts by mass of water, and 0.7 parts by mass of tetramethyldivinyldisilazane were placed in a mixer. The mixture was mixed at room temperature until the mixture was uniform. Subsequently, the mixture was subjected to a heat treatment at 200° C. for 2 hours under reduced pressure. Thereby, Silica master batch 1 was prepared.

Preparation Example 2

100 parts by mass of a dimethylpolysiloxane with both ends of the molecular chain blocked with dimethylvinylsiloxy groups, having a viscosity of 40,000 mPa·s (content of vinyl groups=about 0.09% by mass), 47 parts by mass of a dry silica (CAB-O-SIL S-17D), 9.2 parts by mass of hexamethyldisilazane, 1.8 parts by mass of water, and 0.3 parts by mass of tetramethyldivinyldisilazane were placed in a mixer. The mixture was mixed at room temperature until the mixture was uniform. Subsequently, the mixture was subjected to a heat treatment at 200° C. for 2 hours under reduced pressure. Thereby, Silica master batch 2 was prepared.

Preparation Example 3

100 parts by mass of a dimethylpolysiloxane with both ends of the molecular chain blocked with dimethylvinylsiloxy groups, having a viscosity of 2,000 mPa·s (content of vinyl groups=about 0.23% by mass), 57 parts by mass of a wet silica (SIPERNAT 200), 8.4 parts by mass of hexamethyldisilazane, and 3.5 parts by mass of water were placed in a mixer. The mixture was mixed at room temperature until the mixture was uniform. Subsequently, the mixture was subjected to a heat treatment at 200° C. for 2 hours under reduced pressure. Thereby, Silica master batch 3 was prepared.

Preparation Example 4

100 parts by mass of a dimethylpolysiloxane with both ends of the molecular chain blocked with dimethylvinylsiloxy groups, having a viscosity of 2,000 mPa·s (content of vinyl groups=about 0.23% by mass), 57 parts by mass of a wet silica (SIPERNAT 320DS), 8.4 parts by mass of hexamethyldisilazane, and 3.5 parts by mass of water were placed in a mixer. The mixture was mixed at room temperature until the mixture was uniform. Subsequently, the mixture was subjected to a heat treatment at 200° C. for 2 hours under reduced pressure. Thereby, Silica master batch 4 was prepared.

Preparation Example 5

100 parts by mass of a dimethylpolysiloxane with both ends of the molecular chain blocked with dimethylvinylsiloxy groups, having a viscosity of 400 mPa·s (content of vinyl groups=about 0.47% by mass), 60 parts by mass of a wet silica (ZIPSIL LP), 10.6 parts by mass of hexamethyldisilazane, and 4.2 parts by mass of water were placed in a mixer. The mixture was mixed at room temperature until the mixture was uniform. Subsequently, the mixture was subjected to a heat treatment at 200° C. for 2 hours under reduced pressure. Thereby, Silica master batch 5 was prepared.

In Silica master batches 1, 2 and 4, the amount of ammonia was measured in accordance with the following measurement method. As a result, the amounts of ammonia contained in Silica master batches 1, 2 and 4 were 19 ppm, 55 ppm and 100 ppm, respectively.

Measurement Method

Amount of ammonia: 1.5 g of the silica master batch was weighed. 60 ml of toluene was added thereto and the silica master batch was dissolved therein. 20 g of 5 mM nitric acid was added to the obtained solution and the mixture was shaken and mixed for 2 hours. Subsequently, the mixture was subjected to centrifugation. The ammonia extracted in the aqueous phase was quantitated.

Preparation of a Silicone Elastomer Composition

The components shown in the following Table 1 in the proportions shown in Table 1 were uniformly mixed, and silicone compositions 1 to 8 which were curable at room temperature (hereinafter, independently referred to as Bases 1 to 8, respectively) were obtained.

TABLE 1

|  | Base 1 | Base 2 | Base 3 | Base 4 | Base 5 | Base 6 | Base 7 | Base 8 |
|---|---|---|---|---|---|---|---|---|
| Master batch 1 | — | — | — | 42.4 | 25 | — | 58 | 42.4 |
| Master batch 2 | — | — | — | — | — | 22.2 | — | — |
| Master batch 3 | 55.5 | — | — | — | 22.2 | — | — | — |
| Master batch 4 | — | 55.5 | — | — | — | 19.5 | — | — |
| Master batch 5 | — | — | 53.7 | — | — | — | — | — |
| A-1 | 5 | 5 | 5 | 9 | 9 | 9 | 9 | 9 |
| A-2 | — | — | — | — | — | 8.5 | — | — |
| A-3 | 27 | 27 | 40.7 | 26.7 | 17.2 | 40.2 | 20.4 | 40 |
| A-4 | — | — | — | — | 18 | — | — | — |
| A-5 | — | — | 13.3 | — | — | — | — | — |
| F-1 | 11.9 | 11.9 | — | 8 | 8 | — | 12 | 8 |
| Platinum-based catalyst | 0.6 | 0.6 | 0.6 | 0.6 | 0.6 | 0.6 | 0.6 | 0.6 |
| Viscosity (mPa·s) | 5950 | 6900 | 4620 | 5500 | 11600 | 7500 | 5350 | 2850 |
| Amount of silica (%) | 20 | 20 | 20 | 15 | 17 | 14 | 20 | 15 |
| Wet silica/(dry silica + wet silica) (%) | 100 | 100 | 100 | 0 | 48 | 56.5 | 0 | 0 |

A-1: Dimethyl/methylvinylpolysiloxane in which both ends of the molecular chain are blocked with dimethylvinylsiloxy groups, having a viscosity of 420 mPa·s (content of vinyl groups = about 1.06% by mass)
A-2: Dimethylpolysiloxane in which both ends of the molecular chain are blocked with dimethylvinylsiloxy groups, having a viscosity of 400 mPa·s (content of vinyl groups = about 0.47% by mass)
A-3: Dimethylpolysiloxane in which both ends of the molecular chain are blocked with dimethylvinylsiloxy groups, having a viscosity of 2,000 mPa·s (content of vinyl groups = about 0.23% by mass)
A-4: Dimethylpolysiloxane in which both ends of the molecular chain are blocked with dimethylvinylsiloxy groups, having a viscosity of 10,000 mPa·s (content of vinyl groups = about 0.13% by mass)
A-5: Dimethylpolysiloxane in which both ends of the molecular chain are blocked with dimethylvinylsiloxy groups, having a viscosity of 40,000 mPa·s (content of vinyl groups = about 0.09% by mass)
F-1: Dimethylpolysiloxane having a viscosity of 50 mPa·s
Platinum-based catalyst: Divinyltetramethyldisiloxane solution of a 1,3-divinyltetramethyldisiloxane complex with platinum Examples 1 to 17 and Comparative Examples 1 to 11

With respect to each of Bases 1 to 8, a cured product was obtained by using Curing agent 1 and Curing agent 2 having the compositions shown in the following Table 2 in the ratios shown in the following Tables 3 to 12, and curing the composition at room temperature. In addition, with respect to each of the cured products, the loss tangent, tensile strength, tearing strength and feeling on touch were measured in accordance with the measurement methods shown below. In the Examples shown in Tables 7, 9 and 10, discoloration was also measured in addition to the aforementioned properties. The results are also shown in Tables 3 to 12.

TABLE 2

|  | Curing agent 1 | Curing agent 2 |
|---|---|---|
| B-1 | 74 | — |
| B-2 | — | 50 |
| E-1 | — | 49 |
| F-1 | 24.9 | — |
| Curing retardant 1 | 1.1 | — |
| Curing retardant 2 | — | 1 |

B-1: Dimethyl/methylhydrogenpolysiloxane in which both ends of the molecular chain are blocked with dimethylhydrogensiloxy groups, having a viscosity of 29 mPa·s (content of hydrogen atoms bonded to silicon atoms = about 0.15% by mass)
B-2: Dimethyl/methylhydrogenpolysiloxane in which both ends of the molecular chain are blocked with dimethylhydrogensiloxy groups, having a viscosity of 27 mPa·s (content of hydrogen atoms bonded to silicon atoms = about 0.10% by mass)
E-1: Dimethylpolysiloxane in which both ends of the molecular chain are blocked with dimethylhydrogensiloxy groups, having a viscosity of 38 mPa·s (content of hydrogen atoms bonded to silicon atoms = about 0.06% by mass)
Curing retardant 1: Methyl(tris(1,1-dimethyl-2-propynyloxy)silane
Curing retardant 2: Tetramethyltetravinyl-cyclotetrasiloxane

TABLE 3

|  | Example 1 | Example 2 | Example 3 | Comparative Example 1 |
|---|---|---|---|---|
| Base 1 | 100 | 100 | 100 | 100 |
| Curing agent 1 | 4.5 | 4.9 | 5.1 | 5.3 |
| Asker C hardness | 3 | 7 | 11 | 14 |
| Tan δ | 0.30 | 0.23 | 0.17 | 0.14 |
| Tensile strength (MPa) | 0.75 | 1.19 | 1.73 | 1.86 |
| Elongation (%) | 710 | 725 | 845 | 920 |
| Tearing strength | 1.7 | 2.3 | 3.1 | 3.5 |
| Feeling on touch | Superior | Superior | Good | Inferior |

TABLE 4

|  | Example 4 | Example 5 | Comparative Example 2 | Comparative Example 3 |
|---|---|---|---|---|
| Base 2 | 100 | 100 | 100 | 100 |
| Curing agent 1 | 4.8 | 5.2 | 5.3 | 5.4 |
| Asker C hardness | 5 | 8 | 11 | 14 |
| Tan δ | 0.26 | 0.19 | 0.16 | 0.14 |
| Tensile strength (MPa) | 1.14 | 1.45 | 1.65 | 2.07 |
| Elongation (%) | 800 | 800 | 800 | 870 |
| Tearing strength | 2.2 | 3.1 | 3.8 | 4.4 |
| Feeling on touch | Superior | Good | Inferior | Inferior |

TABLE 5

|  | Example 6 | Example 7 | Comparative Example 4 | Comparative Example 5 |
|---|---|---|---|---|
| Base 3 | 100 | 100 | 100 | 100 |
| Curing agent 1 | 7.0 | 7.5 | 8.0 | 8.5 |
| Asker C hardness | 4 | 9 | 11 | 16 |
| Tan δ | 0.24 | 0.18 | 0.16 | 0.13 |
| Tensile strength (MPa) | 0.53 | 1.25 | 1.63 | 1.62 |
| Elongation (%) | 555 | 685 | 705 | 600 |
| Tearing strength | 1.7 | 2.0 | 2.8 | 2.9 |
| Feeling on touch | Superior | Good | Inferior | Inferior |

TABLE 6

|  | Example 8 | Example 9 | Comparative Example 6 | Comparative Example 7 |
|---|---|---|---|---|
| Base 4 | 100 | 100 | 100 | 100 |
| Curing agent 1 | 6.5 | 6.8 | 7.8 | 8 |
| Asker C hardness | 5 | 7 | 15 | 18 |
| Tan δ | 0.23 | 0.20 | 0.12 | 0.11 |
| Tensile strength (MPa) | 0.62 | 0.84 | 1.15 | 1.18 |
| Elongation (%) | 480 | 505 | 520 | 525 |
| Tearing strength | 1.1 | 1.2 | 1.8 | 1.9 |
| Feeling on touch | Superior | Superior | Inferior | Inferior |

TABLE 7

|  | Example 10 | Example 11 | Example 12 | Example 13 |
|---|---|---|---|---|
| Base 7 | 100 | 100 | 100 | 100 |
| Curing agent 2 | 9.7 | 10.5 | 11 | 11.3 |
| Asker C hardness | 5 | 10 | 15 | 17 |
| Tan δ | 0.27 | 0.19 | 0.16 | 0.13 |
| Tensile strength (MPa) | 0.47 | 0.98 | 1.28 | 1.62 |
| Elongation (%) | 460 | 595 | 570 | 595 |
| Tearing strength | 1.4 | 2.5 | 3.8 | 4.9 |
| Feeling on touch | Superior | Good | Good | Good |
| Discoloration | Superior | Superior | Superior | Superior |

TABLE 8

|  | Example 14 | Example 15 | Example 16 | Example 17 |
|---|---|---|---|---|
| Base 5 | 100 | 100 | 100 | 100 |
| Curing agent 1 | 5.4 | 5.8 | 6.3 | 6.6 |
| Asker C hardness | 5 | 7 | 14 | 18 |
| Tan δ | 0.28 | 0.26 | 0.17 | 0.13 |
| Tensile strength (MPa) | 0.54 | 0.84 | 1.32 | 1.55 |
| Elongation (%) | 540 | 505 | 570 | 580 |
| Tearing strength | 1.4 | 1.5 | 2.2 | 2.4 |
| Feeling on touch | Superior | Superior | Good | Good |

TABLE 9

|  | Example 18 | Example 19 | Example 20 | Example 21 |
|---|---|---|---|---|
| Base 6 | 100 | 100 | 100 | 100 |
| Curing agent 1 | 5.6 | 6.2 | 6.5 | 7 |
| Asker C hardness | 2 | 7 | 11 | 17 |
| Tan δ | 0.37 | 0.26 | 0.21 | 0.16 |
| Tensile strength (MPa) | 0.3 | 0.6 | 1.08 | 1.38 |
| Elongation (%) | 570 | 630 | 720 | 700 |
| Tearing strength | 0.8 | 1.3 | 2.0 | 2.9 |
| Feeling on touch | Superior | Superior | Superior | Good |
| Discoloration | Inferior | Inferior | Inferior | Inferior |

TABLE 10

|  | Example 22 | Example 23 | Example 24 | Example 25 |
|---|---|---|---|---|
| Base 6 | 100 | 100 | 100 | 100 |
| Curing agent 2 | 8.2 | 8.5 | 9 | 10 |
| Asker C hardness | 4 | 7 | 12 | 20 |
| Tan δ | 0.44 | 0.36 | 0.26 | 0.17 |
| Tensile strength (MPa) | 0.46 | >0.72* | >1.16* | 1.74 |
| Elongation (%) | 940 | >900* | >1000* | 950 |
| Tearing strength | 1.5 | 1.9 | 2.2 | 2.4 |
| Feeling on touch | Superior | Superior | Superior | Good |
| Discoloration | Superior | Superior | Superior | Superior |

*The elongation exceeded 900% and fracturing did not occur. For this reason, measurements could not be performed.

TABLE 11

|  | Comparative Example 8 | Comparative Example 9 | Comparative Example 10 | Comparative Example 11 |
|---|---|---|---|---|
| Base 7 | 100 | 100 | 100 | 100 |
| Curing agent 1 | 7.2 | 7.4 | 7.7 | 8 |
| Asker C hardness | 5 | 7 | 11 | 17 |
| Tan δ | 0.15 | 0.14 | 0.11 | 0.08 |
| Tensile strength (MPa) | 0.38 | 0.71 | 0.84 | 1.5 |
| Elongation (%) | 350 | 510 | 410 | 440 |
| Tearing strength | 1.0 | 1.1 | 1.46 | 3.0 |
| Feeling on touch | Inferior | Inferior | Inferior | Inferior |

TABLE 12

|  | Comparative Example 12 | Comparative Example 13 | Comparative Example 14 | Comparative Example 15 |
|---|---|---|---|---|
| Base 8 | 100 | 100 | 100 | 100 |
| Curing agent 1 | 7 | 7.3 | 8 | 8.6 |
| Asker C hardness | 5 | 7 | 15 | 17 |
| Tan δ | 0.17 | 0.15 | 0.10 | 0.09 |
| Tensile strength (MPa) | 0.30 | 0.28 | 1.10 | 1.20 |
| Elongation (%) | 400 | 335 | 500 | 500 |
| Tearing strength | 0.9 | 1.0 | 1.6 | 1.6 |
| Feeling on touch | Inferior | Inferior | Inferior | Inferior |

Measurement Methods

Asker C hardness: In accordance with the test method using a type C hardness tester specified in JIS K7312. Two test pieces of a cured product (in the form of a disc having a thickness of 6 mm and a diameter of 70 mm) were stacked and used.

Loss tangent (tan δ): Based on a viscoelasticity measurement by means of a dynamic analyzer ARES (vibrational frequency=1 Hz, strain=10%, the sample was in the form of a disc having a diameter of 25 mm and a thickness of 5 mm).

Tensile strength and elongation: In accordance with JIS K6251. Dumbbell No. 1 was used.

Tearing strength: In accordance with JIS K6252. Crescent, cut=1 mm.

Feeling on touch: The surface of a test piece of a cured product (in the form of a disc having a thickness of 6 mm and a diameter of 70 mm) was powdered with talc, and evaluation thereof was carried out by pushing the test piece with fingers. The evaluation criteria is shown below.

Superior: A superior feeling on touch like real skin is provided.

Good: A slightly hard feeling on touch is exhibited, but a natural feeling on touch like real skin is provided.

Inferior: Hardness is felt so that a core is present, and an unnatural feeling on touch is exhibited.

Discoloration: A test piece (in the form of a disc having a thickness of 6 mm and a diameter of 70 mm) of a cured product was allowed to stand for 10 hours at 100° C. Visual observation of the degree of discoloration was carried out. The evaluation criteria is described below.

Superior: No discoloration was observed.

Inferior: The test piece was discolored to brown, and remarkable discoloration was observed.

The invention claimed is:

1. An artificial integument formed from a cured product of a hydrosilylation-curable silicone elastomer composition characterized by satisfying the following formula:

$$\tan \delta \geqq 0.23 - 0.006X$$

wherein tan δ represents the loss tangent of the artificial integument; and X represents the Asker C hardness of the artificial integument.

2. The artificial integument according to claim 1, wherein in said formula, tan δ is 0.2 or more.

3. The artificial integument according to claim 1, wherein the hydrosilylation-curable silicone elastomer composition comprises fine powder of a silica in an amount ranging from 5 to 30% by mass.

4. The artificial integument according to claim 3, wherein said fine powder of a silica contains a wet silica in an amount of 10% by mass or more with respect to the amount of said fine powder.

5. The artificial integument according to claim 1, wherein the hydrosilylation-curable silicone elastomer composition has a viscosity of not more than 20,000 mPa·s.

6. The artificial integument according to claim 1, wherein the hydrosilylation-curable silicone elastomer composition is curable by a hydrosilylation reaction and curable at room temperature.

7. The artificial integument according to claim 6, wherein the hydrosilylation-curable silicone elastomer composition comprises a siloxane containing an alkenyl group.

8. The artificial integument according to claim 1, wherein the artificial integument has a tensile strength of not less than 0.3 MPa.

9. A model or robot equipped with the artificial integument as recited in claim 1.

10. The artificial integument according to claim 1, wherein in said formula, X is a positive number of 20 or less.

11. The artificial integument according to claim 2, wherein in said formula, X is a positive number of 20 or less.

12. The artificial integument according to claim 1, wherein the artificial integument has an elongation of not less than 420%.

13. The artificial integument according to claim 8, wherein the artificial integument has an elongation of not less than 420%.

* * * * *